July 18, 1933.　　　F. A. NELSON　　　1,918,776
BRAKE ACTUATING MECHANISM
Filed Nov. 18, 1930　　　2 Sheets-Sheet 2
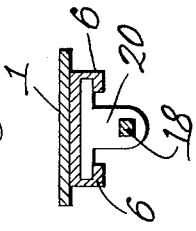
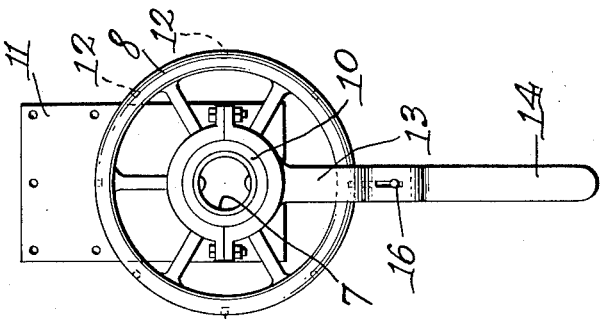
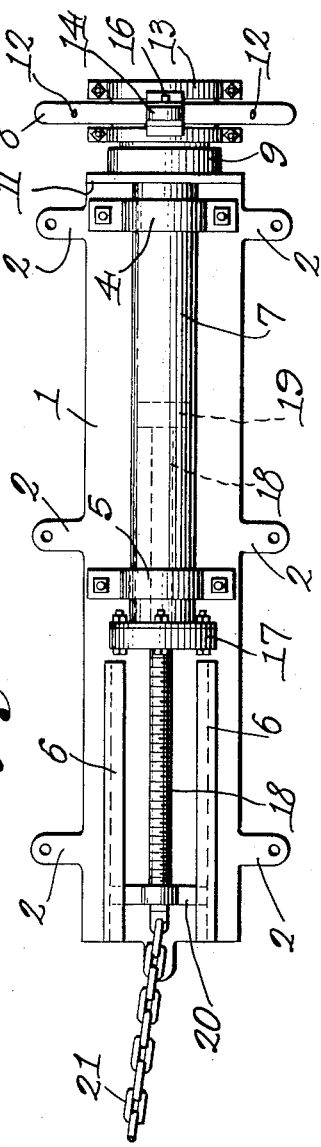
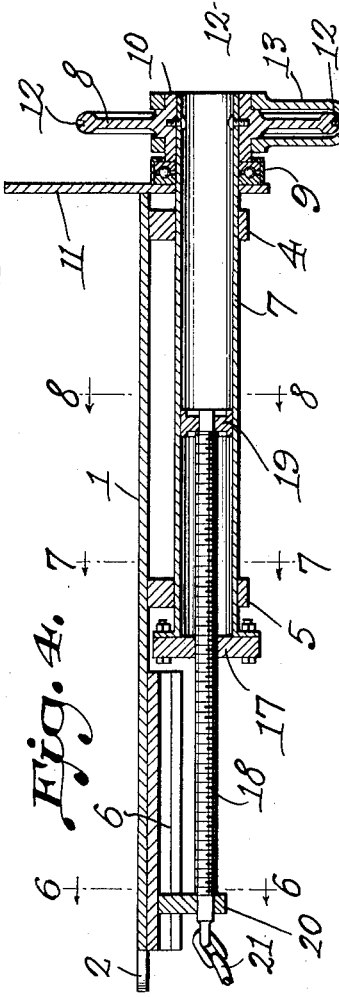
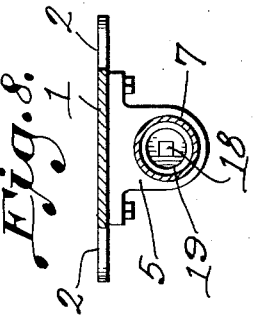
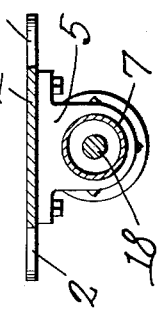
F. A. Nelson Inventor Patented July 18, 1933

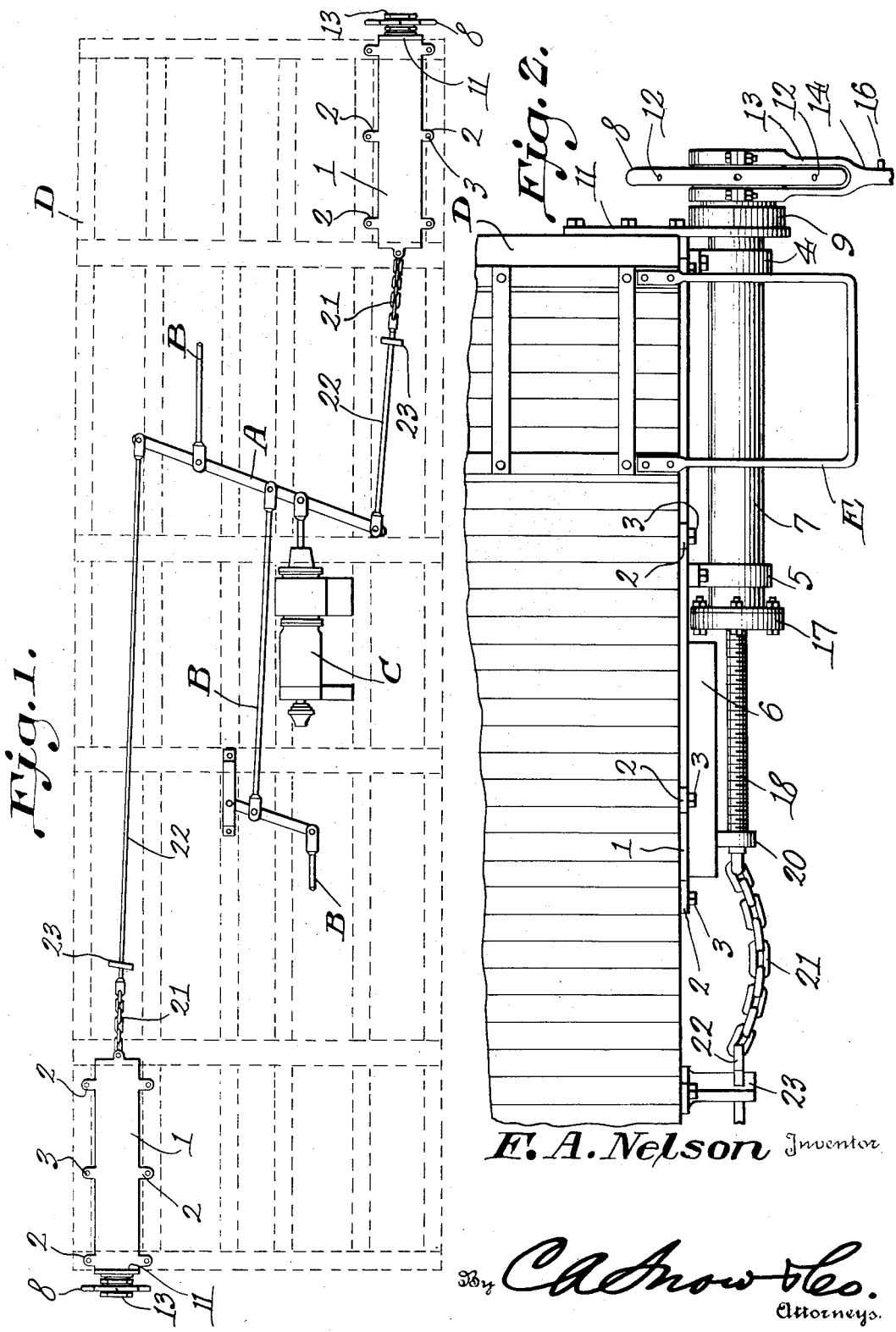

1,918,776

UNITED STATES PATENT OFFICE

FRANK A. NELSON, OF LAKELAND, FLORIDA

BRAKE ACTUATING MECHANISM

Application filed November 18, 1930. Serial No. 496,524.

This invention relates to mechanism for actuating brakes and is designed more especially for use on railway freight cars.

It is the general practice to equip freight cars with hand wheels located adjacent to the ends of the roof. It frequently happens that a brakeman while endeavoring to bring a freight car under control by the use of the hand wheel is thrown from the car due to its violent impact against another car or some other obstacle. These accidents have often resulted seriously. Furthermore it has always been necessary for the brakeman to ascend to the top of the car in order to apply the brakes and this, too, has been dangerous.

It is an object of the present invention to provide a brake actuating mechanism which can be reached by a brakeman at the side of the track while the car is passing and which can also be actuated by him while standing on the lower step or stirrup provided at the lower end of the ladder usually located adjacent each end of the car.

A still further object is to provide a brake actuating mechanism capable of exerting a powerful mechanical advantage on the brake means whereby the wheels can be gripped more tightly by the brake shoes than has been possible heretofore where hand operated mechanisms have been utilized.

Another object is to provide mechanism of this character which can be applied readily to freight cars already in use without altering the brake equipment to an objectionable extent.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings, the preferred form of the invention has been shown.

In said drawings:

Figure 1 is a top plan view of a portion of the brake mechanism of a car equipped with an operating means constituting the present invention, the bottom of the car being indicated by broken lines.

Figure 2 is a side elevation of a portion of one end of a car showing the operating mechanism.

Figure 3 is a bottom plan view of the brake operating mechanism on an enlarged scale.

Figure 4 is a vertical longitudinal section therethrough.

Figure 5 is an end elevation.

Figure 6 is a section on line 6—6, Figure 4.

Figure 7 is a section on line 7—7, Figure 4.

Figure 8 is a section on line 8—8, Figure 4.

Referring to the figures by characters of reference, A designates the usual cylinder lever of an air brake mechanism provided with the usual rod and lever connections indicated generally at B whereby motion may be transmitted to the brake shoes, not shown. The cylinder usually connected to the lever has been indicated at C. The parts thus far mentioned constitute in themselves no part of the present invention and may be varied to meet the requirements of the builder. It is merely essential that a lever A be provided for actuating the brakes used.

The brake operating mechanism constituting the present invention includes an attaching plate 1 adapted to be extended longitudinally of the bottom of the car body at one end thereof and for the purpose of attaching it, ears 2 may be extended laterally therefrom for the reception of bolts 3. That end of the attaching plate adjacent to the end of the car body D is provided with a depending bracket 4 and another similar bracket 5 is extended downwardly from the attaching plate near the center thereof. Arranged along the attaching plate between the bracket 5 and that end of the plate remote from bracket 4 are guide cleats 6 forming a track for the purpose hereinafter explained.

Secured within the brackets 4 and 5 so as to rotate freely is a sleeve 7 one end of which projects beyond the end of the body D and has secured to it a hand wheel 8 whereby the sleeve can be rotated readily. An anti-friction thrust bearing 9 is interposed between the hub 10 of the hand wheel and a backing plate 11 which is secured to the end of the body D and extends downwardly therefrom, the sleeve being rotatable within it.

Formed in the periphery of the hand wheel is an annular series of notches 12 and mounted to swing freely on the hub 10 of the wheel is the forked end 13 of a hand lever 14. This forked end straddles the hand wheel. A latch 15 is slidably mounted in the lever and is adapted to be thrust by means of a finger piece 16 into engagement with any one of the notches, thereby to couple the hand lever to the wheel and permit actuation of the wheel by the lever. Ordinarily, however, the lever 14 is suspended below the hand wheel and will not rotate therewith.

That end of the sleeve 7 adjacent to bracket 5 has a feed nut 17 secured to it and this nut engages an elongated screw 18 one end of which projects into the sleeve 7 and is seated in a block 19 which can slide in the rotating sleeve. This block constitutes a centering means for the screw.

That end of the screw located outside of the sleeve is fixedly secured in any suitable manner within a cross head 20 which is slidable in the guide cleats 6.

Secured to the end of screw 18 close to cross head 20 is a chain 21 which connects the screw to a rod 22, which, in turn, is attached to cylinder lever A. A guide 23 may be provided for the rod.

It is to be understood that under normal conditions the chain is slack and, therefore, the operation of the brakes by the ordinary means will not be interfered with. When it is desired to actuate the brake mechanism for the purpose of applying the brakes the brakeman grasps the wheel 8 and spins it in one direction. This can be done by the brakeman while he is standing on the depending stirrup E or, under some conditions, while the car is passing him. When the wheel is given a spinning action the sleeve 7 rotates in its bearings and causes the rotating nut 17 to draw the screw 18 into the sleeve. Thus cross head 20 will be moved along the guides 6, causing the chain 21 to pull on rod 22 and shift lever A.

A quick application of the brakes is insured by the foregoing operation and should it be desired to apply the brakes with greater pressure, the wheel 8 can be forcibly turned either by grasping its periphery or by coupling lever 14 thereto with latch 15. In the latter event a powerful leverage can be exerted by means of the lever.

It will be noted that the present mechanism can be attached readily to freight cars already in use and will not in any way interfere with the operation of the brake mechanism by the usual means.

What is claimed is:

An actuating means for brake mechanism including an operating hand wheel mounted for rotation, and means operated by the hand wheel for exerting a direct pull upon a brake mechanism, said means including a sleeve rotatable with the wheel, a nut secured to and rotatable with one end of the sleeve, a guide to be secured to the bottom of a car body, a cross head slidable in the guide, a screw secured in and held against rotation by the cross head and operably engaged by the nut, means on one end of the screw and slidable within the rotatable sleeve for supporting said end of the screw in the sleeve, and means for connecting the screw to a brake mechanism.

FRANK A. NELSON.